(12) United States Patent  
Inamoto

(10) Patent No.: US 7,494,223 B2  
(45) Date of Patent: Feb. 24, 2009

(54) POLARIZATION CONVERSION ELEMENT, METHOD OF MANUFACTURING THE SAME AND ILLUMINATION SOURCE UNIT USING THE SAME

(75) Inventor: Masayuki Inamoto, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 478 days.

(21) Appl. No.: 11/390,135

(22) Filed: Mar. 28, 2006

(65) Prior Publication Data

US 2006/0215119 A1 Sep. 28, 2006

(30) Foreign Application Priority Data

Mar. 28, 2005 (JP) ............................. 2005-092453

(51) Int. Cl.
*G03B 21/14* (2006.01)
(52) U.S. Cl. ...................................... 353/20; 359/500
(58) Field of Classification Search .................. 353/20, 353/97; 349/7, 8, 9; 359/486, 500
See application file for complete search history.

(56) References Cited

U.S. PATENT DOCUMENTS

| 6,199,987 B1* | 3/2001 | Haba et al. ..................... 353/34 |
| 6,523,958 B2* | 2/2003 | Takezawa et al. ............. 353/20 |
| 6,846,079 B2* | 1/2005 | Ogawa et al. ................. 353/20 |

FOREIGN PATENT DOCUMENTS

| JP | 11-218724 | 8/1999 |
| JP | 2001-235624 | 8/2001 |

* cited by examiner

*Primary Examiner*—William C Dowling  
(74) *Attorney, Agent, or Firm*—Young & Thompson

(57) ABSTRACT

A polarization conversion device comprises a prismatic beam splitting assembly for separating p- and s- polarized polarized light orthogonal in the direction of polarization from a light source and a single sheet half-wave ($\lambda/2$) plate attached to an exit surface of the prismatic beam splitting assembly for changing one of the p- and s-polarized light 90° in the direction of polarization. The single sheet half-wave ($\lambda/2$) plate has a number of apertures arranged in a checked pattern and is prepared by die-cutting a single optical sheet using a pressing machine and adhered to the exit surface of the beam splitting assembly.

3 Claims, 7 Drawing Sheets

POLARIZATION CONVERSION ELEMENT, METHOD OF MANUFACTURING THE SAME AND ILLUMINATION SOURCE UNIT USING THE SAME

BACKGROUND OF THE INVENTION

1. Field of the invention

The present invention relates to a polarization conversion device having a half-wave ($\lambda/2$) plate for separating two beams of linear polarized light orthogonal in the direction of polarization into coincidence in the direction of polarization with each other and bringing the separated two beams into coincidence with each other, a method of manufacturing the polarization conversion device, and an illumination source device using the polarization conversion device.

2. Description of Related Art

It is popular to use a polarization conversion device for coordinating illumination light beams from a light source in optical systems such as an LCD projection display system as described in, for example, Unexamined Japanese Patent Publication (TokKai) No. 2001-235624, issued Aug. 31, 2001. Reference is made to FIGS. 1(A) and 1(B) showing such a polarization conversion device for the purpose of providing a brief background that will enhance an understanding of the present invention. A polarization conversion device 10 shown in FIG. 1(A) functions as both means for separating p- and s-polarized light, taking the form of a polarizing beam splitter, and means for redirecting one of the polarized beams, taking the form of a right angle prism reflector. Specifically, the polarization conversion device 10 comprises a number of prismatic beam splitting elements 16 having a parallelogram cross section arranged in a straight row. Each of the prismatic beam splitting elements 16 has opposite end surfaces one of which forms a part of an incidence surface 12 of the polarizationconversion device 10 and the other of which forms a part of an exit surface 14 of the polarization conversion device 10, and opposite side surfaces one of which is provided with a polarizing beam splitter (PBS) layer 24 coated thereon and the other of which works as a right angle internal reflection surface. The polarizing beam splitter (PBS) layer 24 partly transmits and partly reflects polarized light to separate two linear polarized light, namely p- and s-polarized light, which are orthogonal in the direction of polarization. Further, the polarization conversion device 10 is provided with half-wave ($\lambda/2$) plate strips 18 attached to exit surfaces of every other prismatic beam splitting elements 16. Each of the half-wave ($\lambda/2$) plate strips 18 rotates the polarized light incident thereupon 90 degrees.

As shown in FIG. 1(B), linearly polarized light is collimated by some means and enters the polarization conversion device 10. The polarizing beam splitter (PBS) layer 24 of each of the prismatic beam splitting elements 16 transmits the p-polarized light and reflects the s-polarized light. The transmitted p-polarized light travels in another prismatic beam splitting 16 adjacent thereto and exits the adjacent prismatic beam splitting element 16, where it is then rotated 90° in the angle of polarization by the half-wave ($\lambda/2$) plate strip 18, and hence converted to s-polarized light On the other hand, the reflected s-polarized light is turned 90° by the internal reflection surface and exits the polarization conversion device 10. The adjacent and spatially separated collimated light beams exiting from the polarization conversion device 10 have been coincident in the direction of polarization (in this case, into an s-polarized state).

A drawback, notably in the case of alternately arranged half-wave ($\lambda/2$) plate strips 18, is the fact that light in one of p- and s-polarized states (in this case, p-polarized light) entering partial areas of the incidence surface 12 of the polarization conversion device 10, corresponding to projections of the half-wave ($\lambda/2$) plate strips 18 on the incidence surface 12 (i.e. end surfaces of the every other prismatic beam splitting elements 16 which are not provided with the half-wave ($\lambda/2$) plate strip 18), can not be converted in the direction of polarization (in this case, into an s-polarized state). Accordingly, a total available area of the incidence surface 12 of the polarization conversion device 10 (working effectively on conversion of the direction of polarization is substantially half as much as the whole incidence surface 12.

There have been proposed various approaches for increasing the available incidence area of the incidence surface of such a conventional polarization conversion device as described above. For example, in the case where a number of small light source or elements such as LEDs are included in a light source device, a plurality of light emitting elements are longitudinally arranged in a column with their optical axes spatially laid along each available incidence area of the surface of incidence 12 of the polarization conversion device 10 so as thereby to project illumination on a locally restricted area, i.e. the available incidence area, of the surface of incidence 12. In the case where a single light source of large size is employed, a fly-eye lens array comprising a number of small lenses is put between the light source and each available incidence area of the surface of incidence 12 of the polarization conversion device 10 so as to provide a number of secondary light sources arranged in columns with their optical axes spatially laid along the available incidence area of the surface of incidence 12, respectively. This single source unit can project illumination on the respective available incidence area of the surface of incidence 12 efficiently. For a more complete description of this proposed solution, see Unexamined Japanese Patent Publication (Tokkai) No. 11-218724, issued Aug. 10, 1999.

Incidentally, a preferable approach for forming an efficient and compact configuration of small size light source elements or small lenses forming the fly-eye lens array is to arrange them in a checked pattern wherein adjacent rows of the light source elements or the lenses are shifted half a pitch from each other. In particular, the small size light source elements are often arranged in a checked pattern in light of the necessity of arranging the light source elements as many much as possible in a specified area. However, because the conventional polarization conversion device has available incidence areas of the incidence surface each of which is long in a lengthwise direction, it id hard to lay optical axes of the light source elements arranged in a checked patter on the available incidence areas.

SUMMARY OF THE INVENTION

It is therefore an object of the present invention to provide a polarization conversion unit which makes it easy to lay optical axes of small size light source elements or small lenses of a fly-eye lens array on available incidence areas of an incidence surface of the polarization conversion device even in the case where the light source elements are arranged in a checked pattern.

It is another object of the present invention to provide an illumination source unit using the polarization conversion device.

It is a further object of the present invention to provide an easy method of manufacturing the polarization conversion device.

According to an aspect of the present invention, the polarization conversion device for bringing two beams of linear polarized light orthogonal in the direction of polarization into coincidence in the direction of polarization with each other comprises beam splitting means for separating beams incident upon available incidence areas of an incidence surface of the polarization conversion device into two beams of polarized light orthogonal in the direction of polarization and half-wave ($\lambda/2$) plate means defining the available incidence areas of the incidence surface for changing one of the two beam of liner polarized light 90° in the direction of polarization, wherein the half-wave ($\lambda/2$) plate means consists of a single sheet having apertures each of which opens a path of the other beam of polarized light and which are arranged in a checked pattern so as thereby to form the available incidence areas of the incidence surface in a checked pattern where each adjacent rows of available incidence areas are shifted half a pitch at which the aperture are arranged in a row.

According to another aspect of the present invention the illumination source unit for bringing two illumination beams of linear polarized light orthogonal in the direction of polarization into coincidence in the direction of polarization with each other comprises the polarization conversion device and a plurality of light source elements arranged in a pattern similar to the checked pattern of the available incidence areas of the incidence surface of the polarization conversion device.

According to a further aspect of the present invention, the method of manufacturing the polarization conversion device comprises the steps of preparing the beam splitting means; forming a plurality of apertures for defining the available incidence areas of the incidence surface of the polarization conversion device in a single sheet of half-wave ($\lambda/2$) plate means so that each of the aperture opens a path of the other illumination beam of polarized light and the apertures are arranged in a checked pattern so as thereby to form the available incident areas of the incidence surface in a checked pattern where each adjacent rows of the available incidence areas are shifted half a pitch at which the aperture are arranged in a row; and attaching the single sheet half-wave ($\lambda/2$) plate means to an exit surface of the polarization conversion device.

The polarization conversion device having available incidence areas arranged in a checked pattern in its incidence surface makes it quite easy to arrange light source elements such as small size light source unit or small lenses of a fly-eye lens array with their optical axes laying on the available incidence areas so as to project illumination onto the available incidence areas even when arranging the small size light source unit or the small lenses in a checked pattern.

BRIEF DESCRIPTION OF THE DRAWINGS

The foregoing and other objects and features of the present invention will be clearly understood from the following detailed description when reading with reference to the accompanying drawings, in which.

DETAILED DESCRIPTION OF THE PREFERRED EMBODIMENTS

Figure 1A:
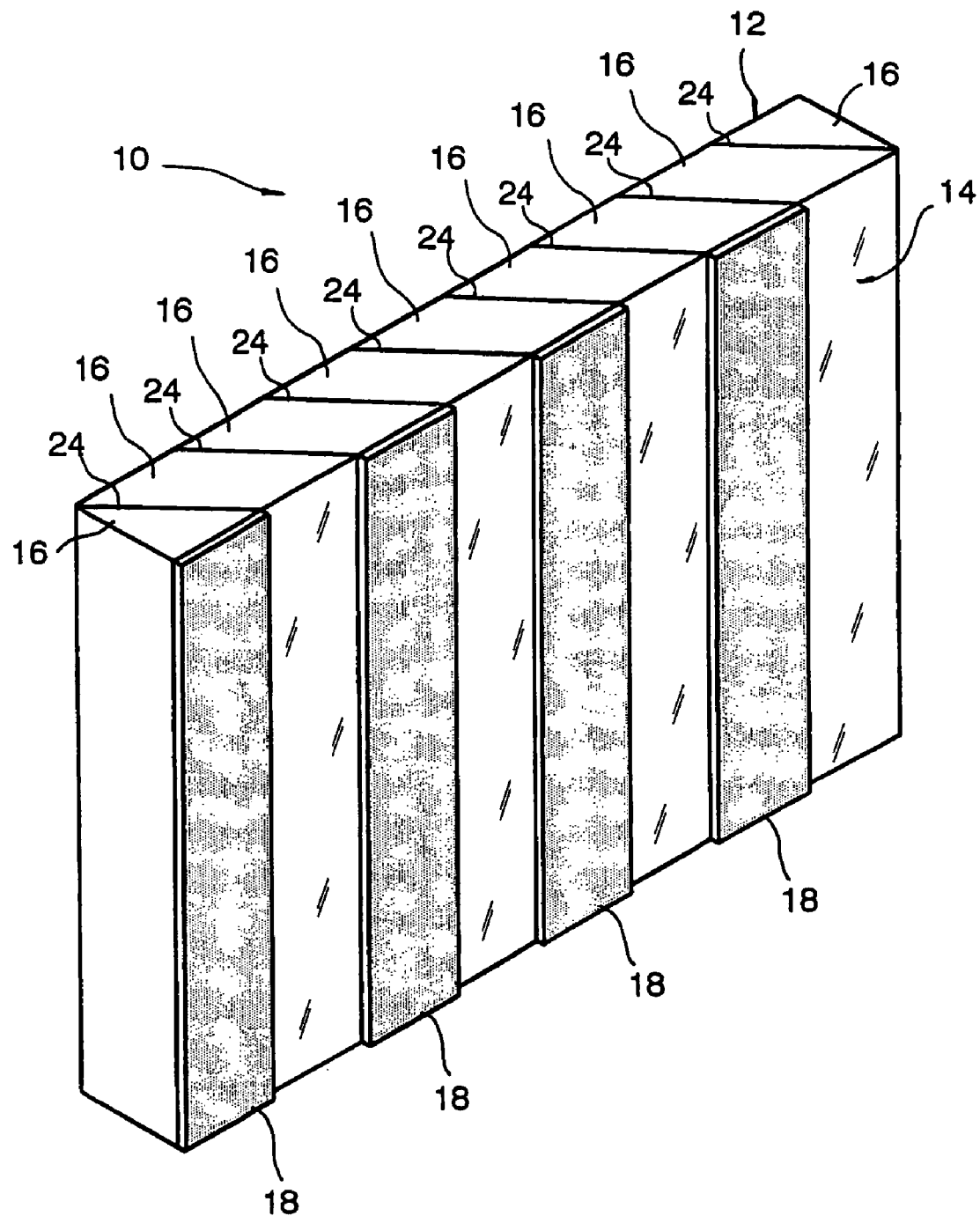
FIG. 1A is a perspective view of a conventional polarization conversion device.
Figure 1B:
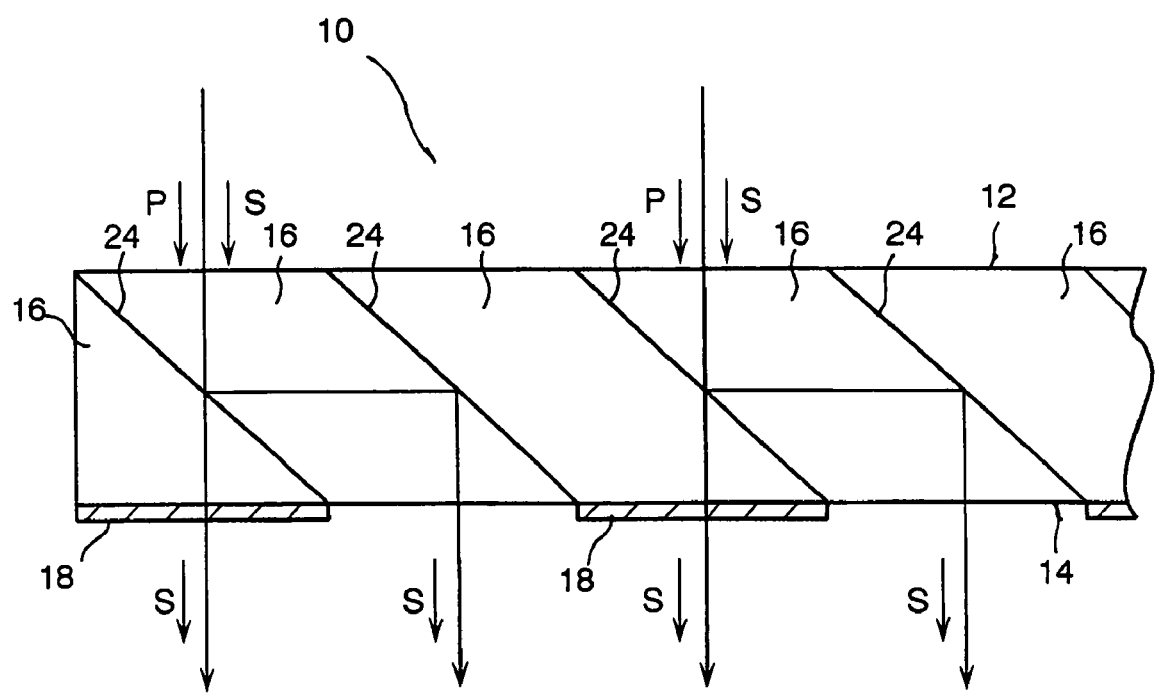
FIG. 1B is a cross-sectional view of the conventional polarization conversion device.
Figure 2:
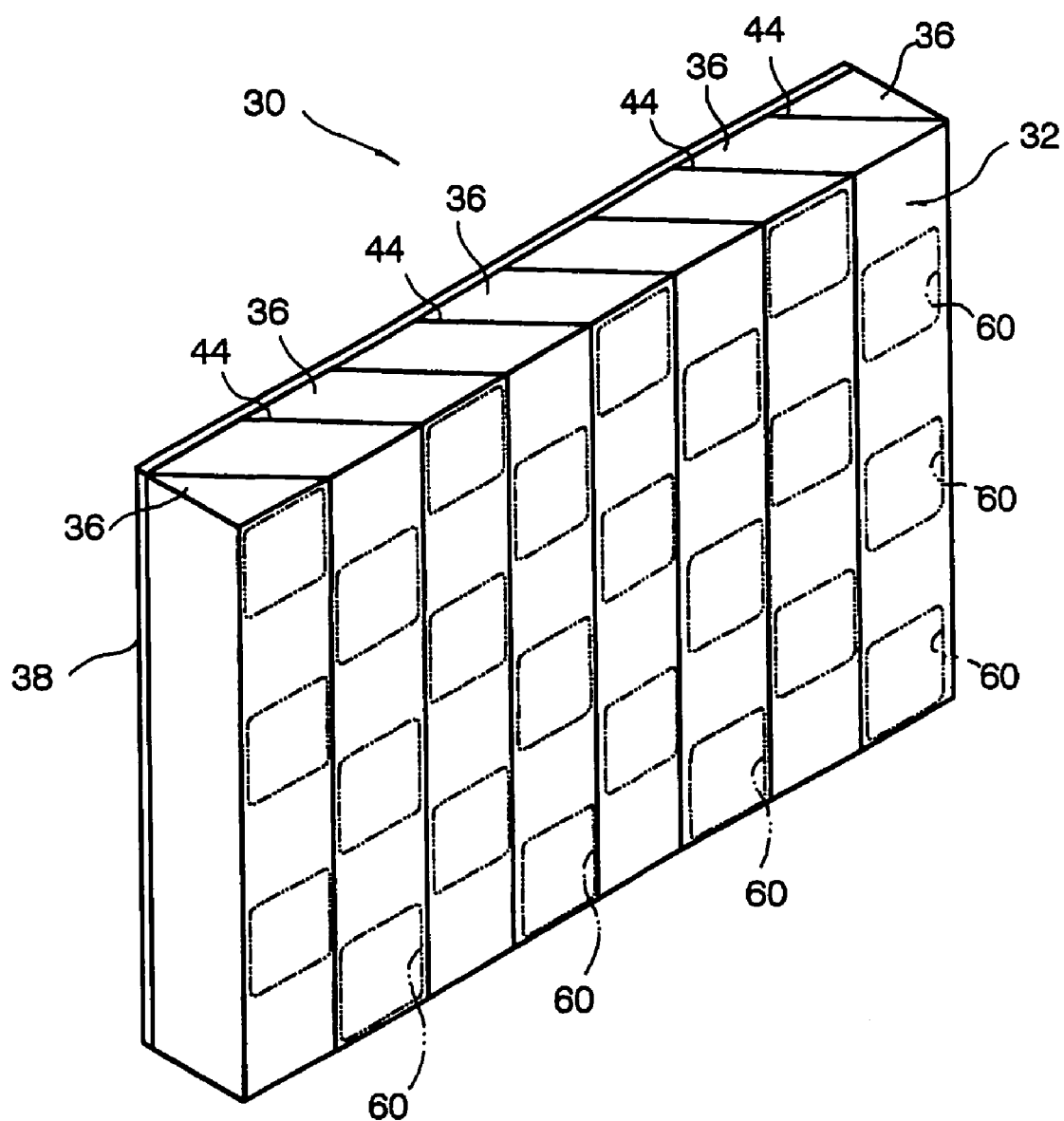
FIG. 2 is a perspective view of a polarization conversion device according to an embodiment of the present invention as viewed from the front.
Figure 3:
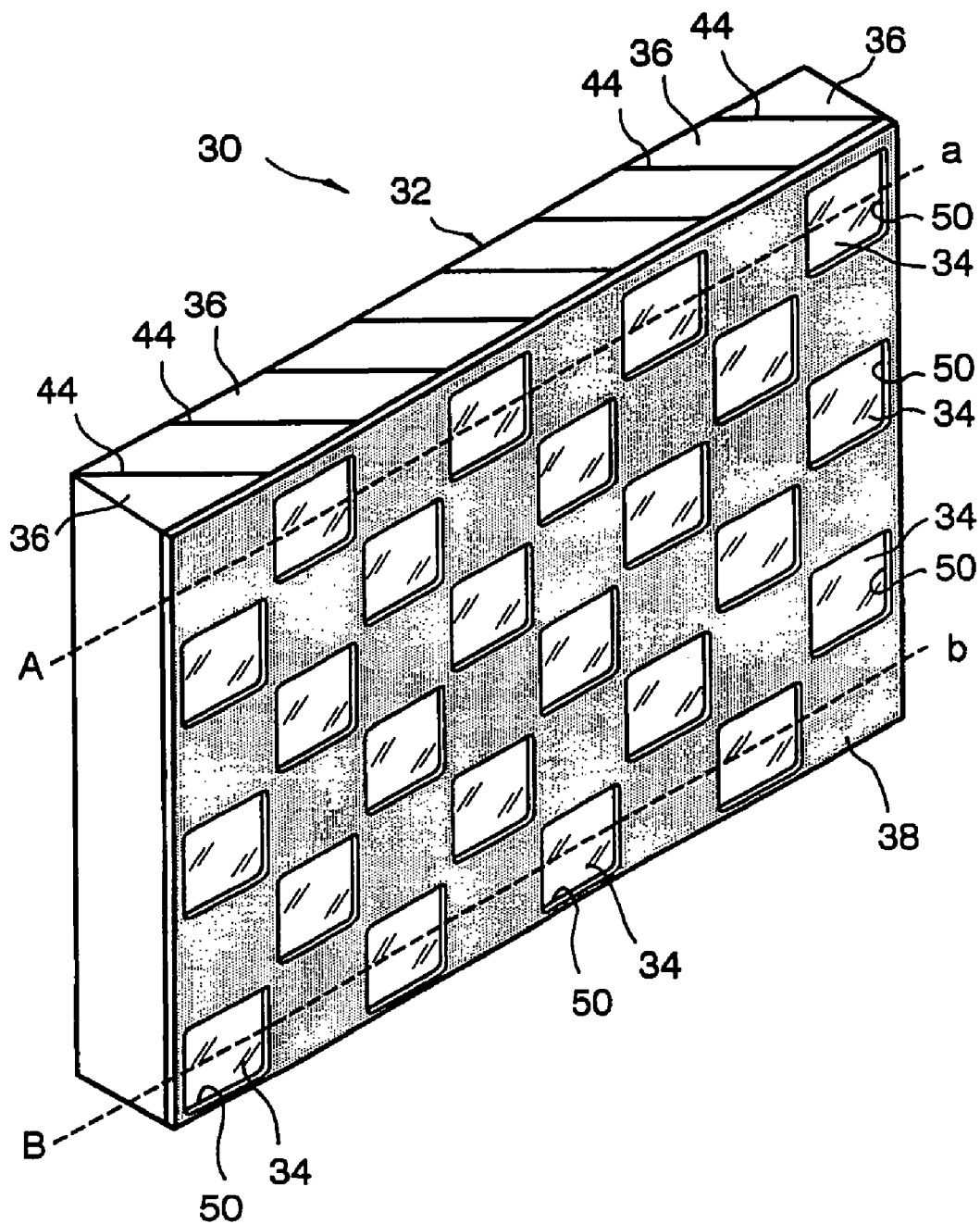
FIG. 3 is a perspective view of the polarization conversion as viewed from the back.

Referring to the accompanying drawings in detail and in particular, to FIGS. 2 and 3 showing a polarization conversion device 30 shaped in a parallel plate for providing s-polarized light for a polarized illumination system (not shown), the polarization conversion device 30 comprises a number of parallelogram cube-shaped optical elements 36 (the element at either end of the device is cut into a triangular cube) arranged in a straight row. Each of the optical elements 36 has parallel end surfaces one of which forms part of an incidence surface 32 of the polarization conversion device 30 and another of which forms part of an exit surface 34 (see FIG. 4) of the polarization conversion device 30, and parallel side surfaces one of which is provided with a coated layer 44 formed thereon as means for separating p- and s-polarized light, taking a polarizing beam splitter (PBS), and the other of which works as a prismatic reflection surface (a right angle prism function). In this sense, the parallelogram cube-shaped optical elements 36 is hereinafter referred to as a prismatic beam splitting element One of the interior angles between the end surface and the side surface is 45 degrees. The coated layer 44 (which is hereinafter referred to as a polarizing beam splitters: PBS) 44 transmits light in a p-polarized state and reflects light in an s-polarized state. Further, the polarization conversion device 30 comprises a single sheet of half-wave ($\lambda/2$) plate 38 attached to and covering the whole area of an exit surface 34 of the polarization conversion device 30. The half-wave ($\lambda/2$) plate 38 rotates the polarization of light incident thereupon 90 degrees.

Figure 4:
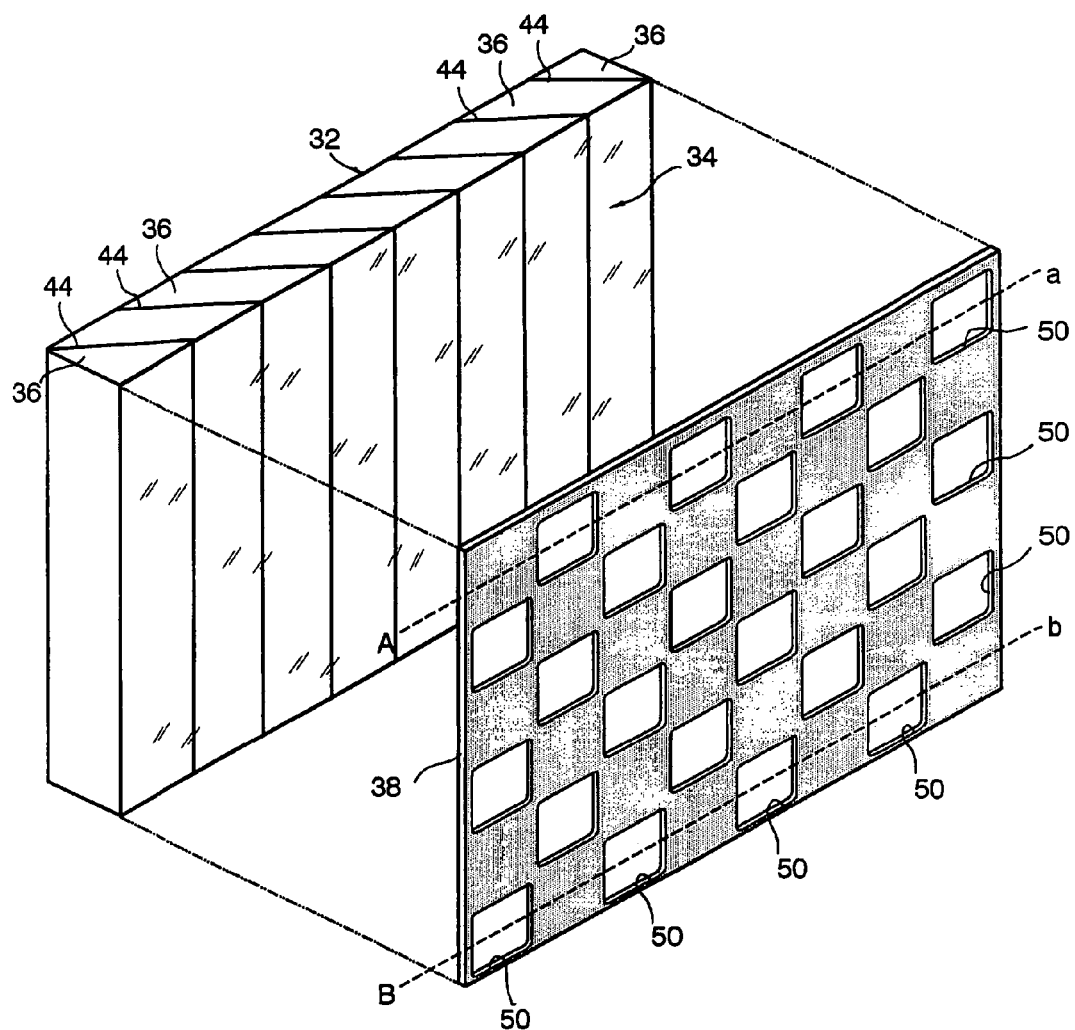
FIG. 4 is an exploded view of the polarization conversion as viewed from the back.

As shown in detail in FIGS. 3 and 4, the half-wave ($\lambda/2$) plates 38 has a number of apertures 50 arranged in a checked pattern where the apertures are arranged at regular distances in line and column to expose the exit surface 34 of the polarization conversion device 30 in a checked pattern. The apertures 50 in each adjacent rows and columns are alternately located at regular distances. More specifically, the apertures 50 in, for example, each of lines (from the top labeled with A-a to the bottom labeled with B-b) are located at regular distances to expose partly the end surfaces of every other prismatic beam splitting elements 36. However, in each two adjacent lines, one line of the apertures 50 is shifted half a pitch (a width of an aperture 50 + a distance to an adjacent aperture 50) from the other line of the aperture 50. Just the same is true on the apertures in column. The half-wave ($\lambda/2$) plate 38 may be prepared by die-cutting an optical sheet as of half-wave ($\lambda/2$) plate using a pressing machine and adhered to the exit surface 34 of the polarization conversion device 30.

Figure 5:
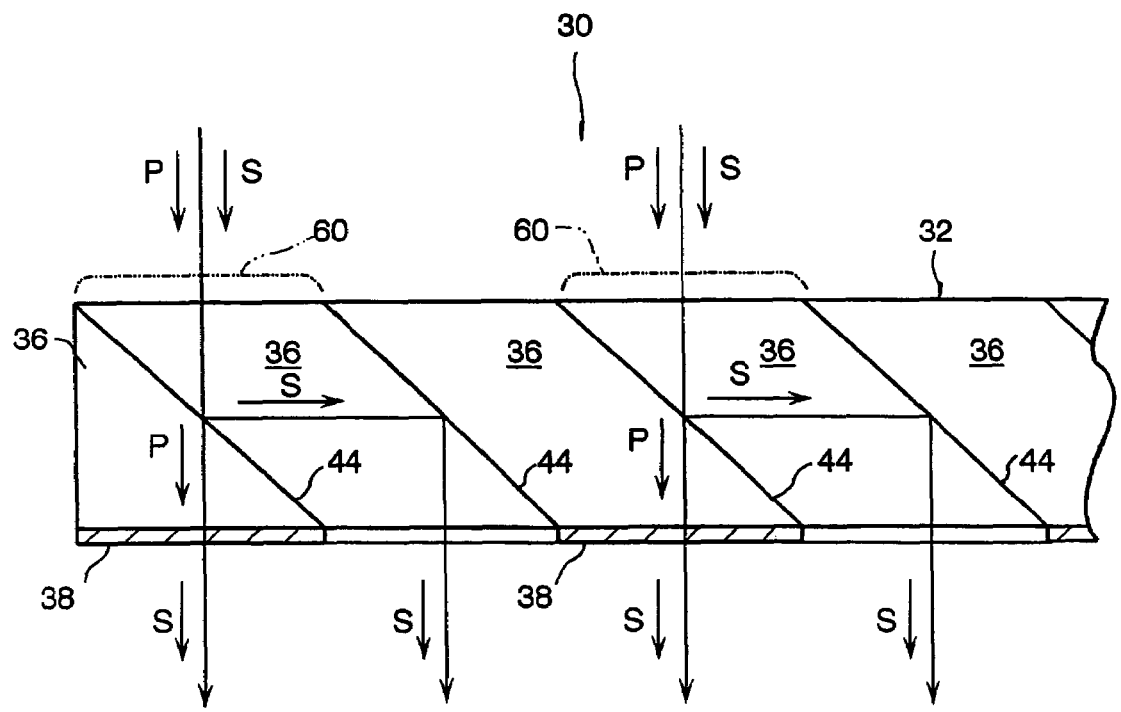
FIG. 5 is a cross-sectional view of the polarization conversion device.

Referring to FIG. 5, when linear polarize light, namely p- and s-polarized light orthogonal in orthogonal in the direction of polarization enters the polarization conversion device 30, the p-polarized light entering at areas 60 of the incidence surface 32 confined by a reflection of the apertures 50 cast on the incidence surface 32 (shown in detail in FIG. 2) is transmitted through the polarizing beam splitters (PBS) 44, where it is then rotated 90° in the angle of polarization, i.e. converted to s-polarized light, by the half-wave ($\lambda/2$) plate 38. The s-polarized light entering at the same areas 60 is turned 90° by the internal reflection surface and comes out through the apertures 50 of the half-wave ($\lambda/2$) plate 38. On the other hand, the p-polarized light entering at the remaining area, other than the areas 60, of the incidence surface 32 is transmitted through the polarizing beam splitters (PBS) 44 and comes out through the apertures 50. The s-polarized light entering at the same areas 60 is turned 90° by the internal reflection surface, where it is then rotated 90° in the angle of polarization, i.e. converted to p-polarized light, by the half-wave (λ/2) plate 38.

As was described previously, the polarization conversion device 30 projects s-polarized illumination for a succeeding optical equipment To this end, in this embodiment, the areas 60 of the incidence surface 32 which are confined by a reflection of the apertures 50 of the half-wave (λ/2) plate 38 are effectively used as an available incidence area (which is hereinafter denoted with a reference numeral 60 as a whole). Accordingly, the available incidence area 60 has a checked pattern similar to the pattern of the apertures 50 of the half-wave (λ/2) plate 38.

Figure 6:
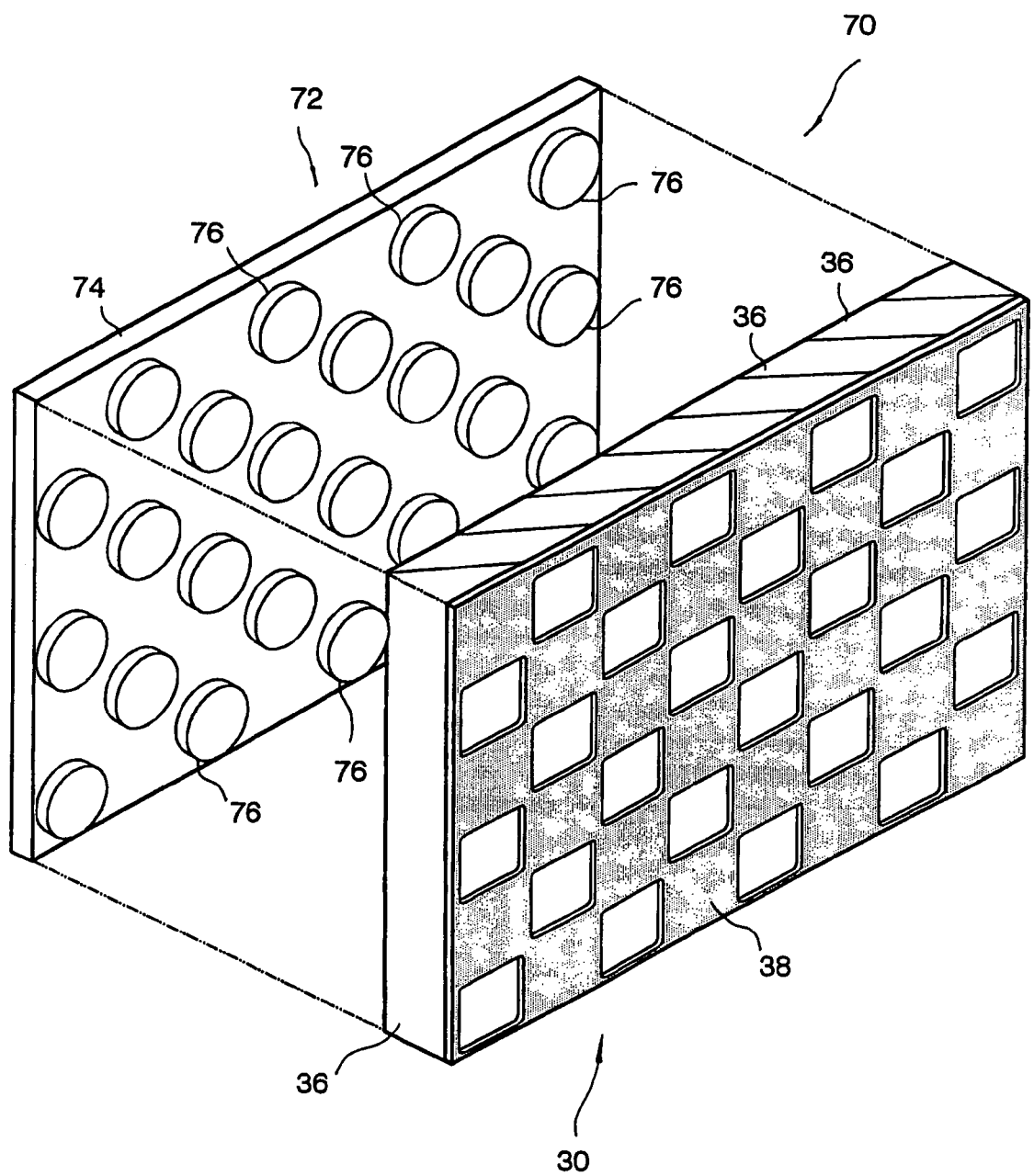
FIG. 6 is an exploded view of a light source unit according to an embodiment of the present invention which is suited for a polarized illumination system.

Referring to FIG. 6, the polarization conversion device 30 is suitably used in combination with a light source unit 72 for use as a polarized illumination system 70 with LCD projectors or LCD displays. The light source unit 72 comprises a base board 74 and a number of light emitting elements such as LEDs 76 arranged in the same checked pattern as the available incidence area 60 of the polarization conversion device 30 on the base board 74. The LEDs 76 are provided with condenser lens (not shown), respectively, so as to focus light efficiently onto the available incidence area 60 of the incidence surface 32 of the polarization conversion device 30.

As just described above, as the polarization conversion device has an available incidence area in a checked pattern in the incident surface thereof, it is achieved to project illumination light emanating from a number of LEDs arranged in a similar checked pattern onto the available incidence area easily. The illumination source unit using the polarization conversion device allows a number of LEDs to be arranged in a checked pattern more efficiently and more compactly as compared with a longitudinal column arrangement of LEDs with their optical axes spatially laid along each available incidence area Accordingly, it is realized to dispose an increased number of LEDs on a specified size of mounting plate so as to provide a larger quantity of light Furthermore, the polarization conversion device is manufactured easily and simply by virtue of attaching the half-wave (λ/2) plate made of a single optical sheet with a number of apertures by die-cutting to the exit surface of the polarization conversion device.

It is, of course, possible to prepare the polarization conversion device by attaching a number of pieces of half-wave (λ/2) plates to the exit surface of the polarization conversion device in a checked pattern or by attaching half-wave (λ/2) plate strips, each strip having a row of apertures and shifted half a pitch from an adjacent strip, to the exit surface of the polarization conversion device. However, these alternate arrangements of half-wave (λ/2) plate pieces or strips take a lot of trouble and cost In addition, the half-wave (λ/2) plate strips are possibly damaged when being cut off from a sheet of half-wave (λ/2) plate. For this reason, it is preferred to use a single sheet of half-wave (λ/2) plate with apertures arranged in a checked pattern.

It is allowed for the illumination source unit to incorporate a single very high pressure mercury lamp or a single very high pressure metal halide lamp in place of a number of LEDs as light source. In this instance, it is suffice to divide illumination into a number of secondary light sources by the use of a fly-eye lens array comprising a number of lenses and to project illumination formed by the secondary light sources onto the available incidence areas of the incident surface of the polarization conversion device. In this case, the lenses forming the fly-eye lens array are arranged effectively and efficiently in a checked pattern in accordance with the checked pattern of available incidence areas of the polarization conversion device.

The polarization conversion device is restricted in details to the above described embodiment as long as coordinating illumination beams of light in the direction of polarization by means of the half-wave (λ/2) plate with apertures arranged in a checked pattern that is attached to the exit surface of the polarization conversion device. For example, when providing p-polarized illumination for the succeeding optical equipment, available incidence areas of the incidence surface of the polarization conversion device or apertures of the half-wave (λ/2) plate may be in a pattern complement to the checked pattern of the case where s-polarized illumination is provided for a succeeding optical equipment as described in the above embodiment. Further, pitches of the beam splitters of the polarization conversion device or of the apertures of the half-wave (λ/2) plate may be changed accordingly to configurations of LEDs or lenses forming the fly-eye lens array.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A polarization conversion device for bringing two beams of linear polarized light, the directions of polarization of the two beams being orthogonal to each other, into coincidence with each other such that the directions of polarization of the two beams are coincident, the device comprising:
   beam splitting means for separating beams incident upon incidence areas of an incidence surface into two beams of polarized light, the first beam having a direction of polarization orthogonal to a direction of polarization of the second beam; and
   half-wave (λ/2) plate means, defining said incidence areas, for changing the direction of polarization of the first beam by 90°,
   wherein said half-wave (λ/2) plate means consists of a single sheet, the sheet having apertures,
   wherein each of the apertures provides a path for the second beam,
   wherein each of the apertures are arranged in a checked pattern of adjacent columns and rows to form said incidence surface in the checked pattern, and
   wherein said apertures are arranged in the checked pattern such that each aperture in a row of the checked pattern is spaced from an adjacent aperture in the row by a distance equal or greater to the width of an aperture, and each row is offset from each other row such that each aperture in a column of the checked pattern is spaced from an adjacent aperture in the column by a distance equal or greater to the height of an aperture.

2. An illumination source unit for bringing two illumination beams of linear polarized light, the directions of polarization of the two beams being orthogonal to each other, into coincidence with each other such that the directions of polarization of the two beams are coincident, said illumination source unit comprising:
   beam splitting means for separating illumination beams incident upon incidence areas of an incidence surface into two illumination beams of polarized light, the first beam having a direction of polarization orthogonal to a direction of polarization of the second beam;

half-wave (λ/2) plate means for changing the direction of polarization of the first beam by 90°, said half-wave (λ/2) plate means consisting of a single sheet with a plurality of apertures, said plurality of apertures defining said incidence areas of the incidence surface, each of the apertures opening a path for the second beam, and said apertures being arranged in a checked pattern of adjacent columns and rows so as to form said incidence surface in the checked pattern; and a plurality of light source elements arranged in a pattern similar to the checked pattern of said incidence areas, wherein said apertures are arranged in the checked pattern such that each aperture in a row of the checked pattern is spaced from an adjacent aperture in the row by a distance equal or greater to the width of an aperture, and each row is offset from each other row such that each aperture in a column of the checked pattern is spaced from an adjacent aperture in the column by a distance equal or greater to the height of an aperture.

3. A method of producing a polarization conversion device for bringing beams of linear polarized light, having orthogonal directions of polarization, into coincidence with respect to direction of polarization, having beam splitting means for separating beams incident upon incidence areas of an incidence surface into two beams of polarized light, a first beam having a direction of polarization orthogonal to a direction of polarization of the second beam, and half-wave (λ/2) plate means for changing the direction of polarization of the first beam by 90°, the method comprising the steps of:

preparing said beam splitting means;

forming a plurality of apertures defining said incidence areas of said incidence surface in a single sheet of said half-wave (λ/2) plate means such that i) each of the apertures opens a path to the second beam and ii) said apertures are in a checked pattern of adjacent columns and rows to form said incidence areas in the checked pattern; and attaching said single sheet to an exit surface of the polarization conversion device, wherein said apertures are arranged in the checked pattern such that each aperture in a row of the checked pattern is spaced from an adjacent aperture in the row by a distance equal of adjacent columns and rows to the width of an aperture, and each row is offset from each other row such that each aperture in a column of the checked pattern is spaced from an adjacent aperture in the column by a distance equal of adjacent columns and rows to the height of an aperture.

* * * * *